Figure 1:
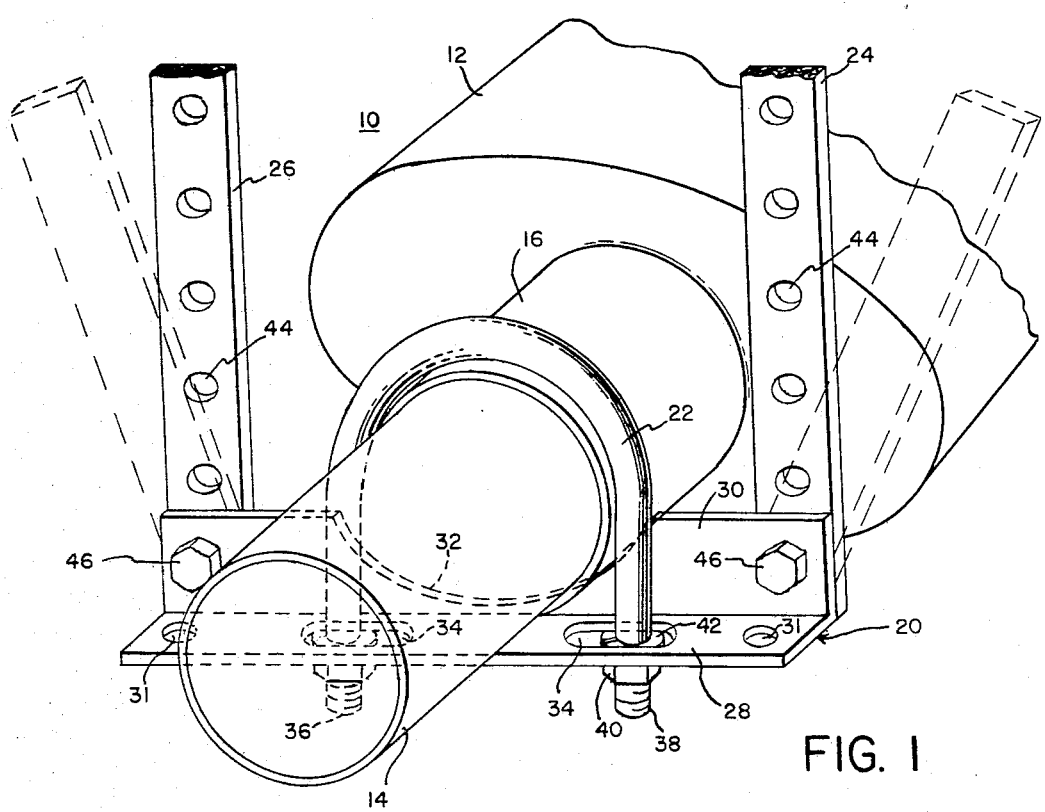

Aug. 10, 1965    P. S. MARTINKOVIC ETAL    3,199,815
UNIVERSAL MUFFLER HANGER
Filed Nov. 21, 1961

*INVENTORS*
PAUL S. MARTINKOVIC
AND
JOHN J. MARTINKOVIC

United States Patent Office 3,199,815
Patented Aug. 10, 1965

3,199,815
UNIVERSAL MUFFLER HANGER
Paul Steve Martinkovic, 17697 Gable St., and John Joseph
Martinkovic, 7482 Buhr St., both of Detroit 12, Mich.
Filed Nov. 21, 1961, Ser. No. 154,404
4 Claims. (Cl. 248—59)

The present invention relates to the exhaust system of a motor vehicle and more particularly to a universal muffler hanger which is adapted to suspendingly support the components of a wide variety of exhaust systems.

Because of the extreme conditions encountered in normal everyday service, the muffler and tailpipe in the present day motor vehicle have a relatively short life and must be replaced regularly. Experience has shown that the hanger brackets supporting these elements are usually badly disintegrated by this time and it is common automotive maintenance practice to replace the associated hanger brackets with the change of a muffler or tailpipe. In many instances, of course, a hanger bracket will fail in service prior to the muffler or tailpipe and require replacement.

This replacement of a hanger bracket in an automobile creates a definite problem for the average repair station. Naturally, the simplest solution to the hanger bracket replacement problem is to obtain an exact duplicate of the originally installed equipment. These brackets are well designed to serve the desired function and give excellent service. However, such brackets are generally designed to be used only in the particular model of automobile in which they are incorporated and few repair stations are in a position to profitably maintain a complete inventory of hanger brackets for each of the voluminous models of automobiles on the road today. Moreover, the acquisition of an original duplicate by the small repair station, because of a number of factors, may be impractical or require an unreasonable length of time.

An alternative solution to the hanger bracket replacement problem is a universal hanger bracket, one capable of use with any of a wide variety of automobile exhaust systems. The prior art is replete with apparent disclosures of such units. However, it has been found that such units are not truly universal, i.e. are limited to use in but few exhaust systems, or are poorly designed to fulfill the desired functions necessary of such units so that they either give undesirable results or quickly fail under the rigid conditions imposed upon the hanger brackets in the normal operation of a motor vehicle.

Accordingly, one object of the present invention is to provide a universal hanger bracket which is capable of use with any of a large variety of exhaust systems.

Another object of the invention is to provide a hanger bracket for an automobile exhaust system which effectively operates to prevent the transmission of the usual vibratory forces and muffler noises to the body of a motor vehicle.

A further object of this invention is the provision of a flexible hanger bracket which will adequately support the muffler and tailpipe while permitting the muffler and tailpipe to move relative to the body of the motor vehicle in accordance with the nominal movements of the engine as well as the movements of the exhaust system caused by the expansion and contraction thereof occurring as a result of the normal operation of the motor vehicle.

Still another object of the invention is the provision of a universal hanger bracket which is simple in construction, cheaply and easily manufactured, and yet exceedingly sturdy and efficient in use.

Figure 2:
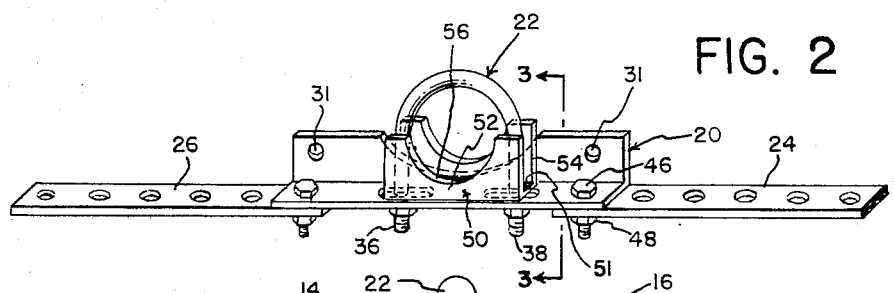
Figure 3:
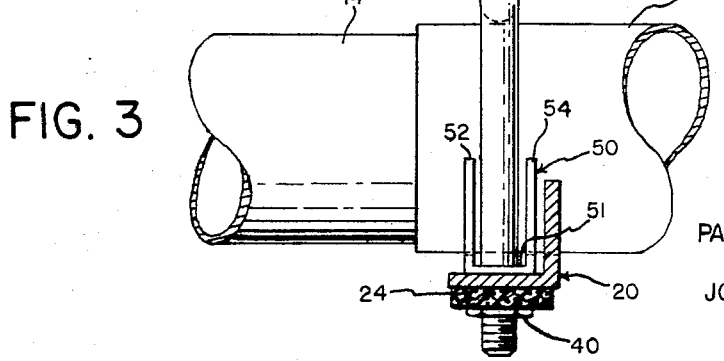

These and other objects, features and advantages of this invention will become readily apparent and appreciated as the same is better understood by reference to the following detailed description when considered in connection with the accompanying sheet of drawing wherein:

FIGURE 1 is a perspective view of our invention in a typical installation on a motor vehicle having, for clarity, certain hidden portions as well as the modified positions of the standards shown in dotted lines;

FIGURE 2 is another perspective view of the invention with an added guide saddle incorporated therein and with the hanger straps or standards attached in their alternate position; and FIGURE 3 is a fragmentary, side elevational view of the hanger bracket taken substantially along the lines 3—3 of FIGURE 2 with a fragmentary portion of a typical muffler-tailpipe connection shown in clamped position.

Referring now to the drawings wherein like reference characters designate like or corresponding parts throughout the several views, there is shown in FIGURE 1 a universal muffler hanger bracket or member 10, embodying features of the instant invention, for suspendingly supporting and securing components of a motor vehicle exhaust system in position. As is well known in the art and thus not shown in the drawings, a motor vehicle exhaust system includes a cylindrical exhaust pipe which is rigidly attached to the outlet manifold of the vehicle engine, a sound absorbing muffler having tubular inlet and outlet portions, and a cylindrical tailpipe, all serially and rigidly connected together. Conventionally, the exhaust pipe, muffler and tailpipe are held in suspended position beneath the chassis of the vehicle by several suitable hanger brackets. Thus, muffler hanger bracket 10 is shown as comprising the suspended support for one end of muffler 12 and tailpipe 14 of an exhaust system. Additionally, bracket 10 is disclosed as comprising the rigid securement and clamping means for retaining the tubular outlet 16 of muffler 12 and the inner end of tailpipe 14 in the required rigidly fixed, gastight relationship. It is to be understood, however, that according to the teachings of the instant invention, hanger bracket 10 may be used equally well to merely support, at differing locations, the various components of the exhaust system without performing any clamping or securing function.

Referring more specifically to FIGURE 1, hanger bracket 10 is shown as comprising a laterally extending support frame or member 20 which is adapted, as will hereinafter more fully be described, to receive and hold in secured position a large number of the various sized components found in the different exhaust systems of the present day motor vehicle, an inverted, U-shaped bolt or clamp 22 for fastening and where desired, tightly clamping the exhaust system components together and to frame 20, and a pair of elongated resilient standards or hangers 24, 26. Standards 24 and 26 are each adjustably connected in secured position on their lower ends to the opposite ends of frame 20 and suitably attached by bolts or the like on their other ends to the chassis, frame or other convenient and accessible member of the motor vehicle, whereby the muffler hanger bracket suspendingly supports the components of the exhaust system in position.

Frame 20 is constructed of a single piece of strong rigid material such as, for example, steel, to resist without flexing the vertical forces imposed upon it by the usual undulatory vibrations of the exhaust system caused by the operating engine and/or movement of the vehicle over rough or uneven roads. Preferably, frame 20 comprises a horizontal, laterally extending base 28 which is bent at its rearward edge in a right angle to form an integral, contiguous, vertical flange or saddle 30 of the same length as base member 28. The central, upper portion of flange or saddle 30 is suitably shaped by cutting or otherwise to provide an arcuate saddle seat 32 for receiving the cylindrical members of the exhaust system. Preferably saddle seat 32 is formed in the shape of an arc of a circle wherein the circumference of the circle will approximate the circumference of the largest tubular member found in the standard exhaust systems in service. It will be seen that, as best shown in FIGURE 1, because of the arcuate shape of seat 32, a cylindrical component of the exhaust system will naturally centrally position itself in seat 32 of frame 20 and all tendency of the outlet to shift from this position as a result of any jarring of the system or otherwise is inherently resisted. Moreover, due to the arcuate construction, seat 32 will accommodate and provide a positive seat for a large number of tubular members of varying sizes, lending to its adaptation as a universal bracket.

Base member 28 of support frame 20 is provided, intermediate its ends, with a pair of spaced, longitudinally extending slots 34 for the reception of bolt or clamp 22. Preferably, clamp 22 is constructed of round metal stock and formed in the shape of a U. The straight extremities of legs 36, 38 of clamp 22 are threaded and arranged to extend through slots 34 for securement purposes to the frame 20 as by nuts 40 and associated lockwashers 42. The U-shaped clamp 22 is adapted to engage and closely embrace, in its inverted position, the upper surface of a tubular portion of the exhaust system. Thus, it is seen that with the tubular outlet 16 bearing upon and centrally positioned on its underside in arcuate seat 32 and with the U-shaped bolt of clamp embracing the upper surface of the outlet, the tightening of nuts 40 will provide an axial force to the clamp 22 urging the outlet into a tight wedge-like engagement with flange 30 to not only securely fasten the outlet 16 to frame 20 but to also clamp and seal the inner end of tailpipe 14 within outlet 16 and provide a rigid, gastight connection.

It is to be noted, however, that while frame 20 is described as being shaped by cutting and bending operations, the member is designed such that it may be easily and, preferably, formed by a single, economical, punching operation.

Adjacent each end of base 28 and saddle frame 30 there is provided an aperture 31 for adjustably connecting as by rivets or, as shown, by bolts 46 and associated nuts 48, the standards 24, 26 to the frame 20. Standards 24 and 26 are generally of identical construction and are formed of a tough, resilient but stiff material capable of resisting heavy mechanical stresses as well as withstanding severe moisture and weathering effects. One material found to have the desired characteristics for the standards is a commercially available rubberized fabric comprising multiple consecutive layers of a heavy cord fabric and a rubberized compound. It has been found that a material of this type, approximating one quarter inch in thickness is especially suitable for use as standards 24 and 26.

Each standard is generally rectangular in shape and is provided with a plurality of equally spaced apertures or holes 44 formed substantially intermediate its edge portions and extending for the full length of the elongated standards. The aperture nearest one end of each standard is adapted to receive a securing bolt 46 for adjustably connecting the standard to frame 20. It will be appreciated that by this construction wide flexibility in the angular positioning of standards 24, 26 relative to the frame 20 of muffler hanger bracket 10 and to the motor vehicle is permitted and attained as is shown, for example, by the dotted line position of standards 24, 26 in FIGURE 1. This is especially desirable in a universal hanger bracket which is adapted to replace original equipment hanger brackets designed for a definite vehicle, such as those which use but a single standard, in that the available members of the motor vehicle to which the standards must be attached may not be ideally situated overhead. Similarly, the use of a plurality of apertures in standards 24, 26 further serve to adapt the instant muffler hanger bracket to a wide range of installation situations. Thus, depending upon the location in which the bracket 10 is to be installed, the space limitations imposed by surrounding structures may permit the use of only an extremely short standard or, further, require one standard to be of a length greater than the other. With this invention, the situation is easily and quickly remedied by simply cutting and removing the excess length of standard and using the nearest appropriate aperture for securement.

It will also be apparent that since a pair of standards are employed in muffler hanger bracket 10, each with its individual means of attachment, bracket 10 will hold and maintain the suspended exhaust system components in a firm, balanced position even if one standard is required, because of existing installation conditions, to be at an angle to frame 20 different from that of the other standard.

Attention is further made to the fact that because of the relatively stiff inherent characteristics of the rubberized fabric comprising standards 24, 26, such as its resistance to compressive forces and its relative resilience, the muffler hanger bracket 10 functions well to prevent the transmission of vibratory forces and noise from the exhaust system to the body of the motor vehicle, while permitting the exhaust system to shift as the system expands and contracts with the alternate heating and cooling of the system during normal operations of the motor vehicle.

The muffler hanger bracket shown in FIGURE 2 is similar to construction to the muffler hanger bracket of FIGURE 1 with the exception that a guide saddle or seat 50 has been added and the standards 24, 26 are fixed in their alternate position. To this end, provision by way of apertures 31 formed adjacent the ends of of base 28 are used to secure standards 24, 26 to frame 20 such that the standards extend laterally outwardly rather than in an upwardly direction. This flexibility in the positioning of the standards is required in certain bracket installations due to the particular construction of some motor vehicles.

Guide saddle or seat 50, which is adapted to lie upon base 28, is desirably used in most instances since it provides two additional bearing surfaces for the cylindrical components of the exhaust system. As disclosed, guide seat 50 comprises a unitary horizontally extending member including a horizontal base 51 of slightly longer length than the dimension between the extended legs of clamp 22, and a pair of saddle flanges 52, 54 of the same length as base 51. A pair of spaced apertures, not shown, are formed in base 51 for passage therethrough of the clamp legs 36, 38. Each of the saddle flanges 52, 54 extend upwardly from base 51 in a right angle and are provided on the upper edges, intermediate their ends, with an arcuate seat 56. Preferably, the arcuate seat 56 comprises an arc of a circle having a circumference which is less than the circumference of the circle of the arc forming the seat 32. The circumference of the circle of the arc forming seat 56 is preferably only slightly larger than the circumference of the specific tubular components of the exhaust system to be received thereon. So that the supported tubular member may also have a bearing upon flange 30 when a guide saddle is used, the height of flanges 30, 52 and 54, beneath their respective seats 32, 56, are made approximately the same.

Since it is desirable that both clamp 22 and guide seat 50 closely embrace the tubular component to be clamped therebetween, it is contemplated, although not considered absolutely essential, that several sizes of complementary clamps 22 and guide seats 50 be provided such that when a small tubular component or a relatively large tubular component is encountered, the automobile mechanic may select a more appropriate sized clamp for use with the muffler hanger bracket. In this respect a complementary clamp 22 and guide seat 50 may be defined as a set of these components wherein the dimension between the legs of clamp 22 will approximate the dimension of the largest chord of the arc forming seats 56. To accommodate several sizes of complementary clamps 22 and guide seats 50, the base 28 of flange 20 is provided, as hereberore described, with a pair of spaced elongated slots 34. The slots are desirably of such a length as to receive the legs 36, 38 of the largest and smallest clamp to be used. Normally, it was found that a maximum of five of such complementary units will cover practically all of the different sizes of exhaust system components in use today.

While it will be apparent from the above that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In combination with a motor vehicle exhaust system having a cylindrical portion therein, a universal muffler hanger for suspendingly supporting said cylindrical portion comprising an integral L-shaped support frame including a horizontal, laterally extending base member and a vertical flange of the same length as said base member, an arcuate seat for receiving and supporting the cylindrical portion formed in the upper portion of said vertical flange intermediate its ends, a pair of spaced elongated apertures formed in said base member, a U-shaped clamp member having a pair of integral straight, extended legs adapted in its inverted position to straddle and embrace said cylindrical component with said legs extending through said apertures, threaded means for securing said legs to said support frame for clamping said cylindrical portion in position, securing apertures formed adjacent each end of said base member and said vertical flange, a pair of elongated, relatively stiff, rubberized fabric standards having a plurality of spaced apertures formed along their lengths, means for connecting said standards at their lower ends at said securing apertures, said standards being adapted on their other ends to be secured to a motor vehicle for suspendingly supporting the cylindrical portion of the motor vehicle exhaust system, and an integral guide seat positioned and supported upon said horizontal, laterally extending base member, said guide seat including a pair of spaced vertical saddle flanges each of which has formed on its upper edges intermediate its ends an arcuate seat for receiving and supporting said cylindrical component thereon, and a pair of laterally spaced apertures formed in said integral guide seat intermediate said spaced saddle flanges for receiving the legs of the clamp member, each of said arcuate seats formed on the upper edges of said saddle flanges comprising an arc of a circle having a circumference which is less than the circumference of a circle of the arc comprising the arcuate seat formed in the upper portion of said vertical flange.

2. A universal muffler hanger for supporting the cylindrical components of a motor vehicle exhaust system comprising an integral support frame having a laterally extending base member and a vertical flange, arcuate seat means formed on said vertical flange for receiving and supporting a cylindrical component thereon, a pair of spaced apertures formed in said base member, a U-shaped clamp having a pair of integral leg members, said clamp in its inverted position being adapted to engage and embrace said cylindrical component with said leg members extending through said apertures, means for securing said clamp in said position to said frame, and a pair of elongated, relatively stiff, resilient standards provided with a plurality of spaced apertures formed along their length, each of said standards being adjustably connected on one of its ends to an opposite end of said support frame for selectively positioning said standards relative to the support frame, an integral guide seat positioned upon said base member, said guide seat including a pair of spaced vertical saddle flanges, an arcuate seat formed on the upper portion of each of said saddle flanges intermediate their ends for receiving and supporting the cylindrical component thereon and a pair of spaced apertures formed in the guide seat for receiving the leg members of said U-shaped clamp, said arcuate seats formed in the upper portion of said saddle flanges comprising an arc of a circle having a circumference which is less than the circumference of a circle of the arc comprising the arcuate seat means formed on the vertical flange.

3. A universal muffler bracket for suspendingly supporting the cylindrical components of a motor vehicle exhaust system comprising an L-shaped, integral support frame having a horizontal, laterally extending base member and a vertical flange of the same length as said base member, an arcuate seat for receiving and supporting a cylindrical component of said exhaust system formed in the upper portion of said vertical flange intermediate its ends whereby said cylindrical component will naturally centrally position itself therein, a pair of spaced elongated apertures formed in said base member, a U-shaped clamp member having an integral pair of extended legs adapted in its inverted position to straddle and embrace said cylindrical component with said legs extending through said apertures, threaded means for securing said legs to said support frame for clamping said cylindrical component in position, and a pair of elongated, resilient standards having a plurality of spaced apertures formed along their lengths, said standards, being adjustably secured at their lower ends to the opposite ends of said support member for selectively positioning said standards relative to the support member and being adapted on their other ends to be secured to a motor vehicle for suspendingly supporting the cylindrical members of the motor vehicle exhaust system, an integral guide seat positioned upon said base member, said guide seat having a length substantially less than said base member and including a pair of spaced vertical saddle flanges each of which has formed on its upper edges intermediate its ends an arcuate seat for receiving and supporting said cylindrical component thereon, and a pair of laterally spaced apertures formed in said integral guide seat intermediate said spaced saddle flanges, said apertures coinciding with the apertures in said base member for receiving the legs of the clamp member.

4. A universal muffler bracket for suspendingly supporting the cylindrical components of a motor vehicle exhaust system comprising an L-shaped, integral support frame having a horizontal, laterally extending base member and a vertical flange of the same length as said base member, an arcuate seat for receiving and supporting a cylindrical component of said exhaust system formed in the upper portion of said vertical flange intermediate its ends whereby said cylindrical component will naturally centrally position itself therein, a pair of spaced elongated apertures formed in said base member, a U-shaped clamp member having an integral pair of extended legs adapted in its inverted position to straddle and embrace said cylindrical component with said legs extending through said apertures, threaded means for securing said legs to said support frame for clamping said cylindrical component in position, and a pair of elongated, resilient standards having a plurality of spaced apertures formed along their lengths, said standards being adjustably secured at their lower ends to the opposite ends of said support member for selectively positioning said standards relative to the support member and being adapted on their other ends to be secured to a motor vehicle for suspendingly supporting the cylindrical members of the motor vehicle exhaust system, integral guide seat positioned upon said base member, said guide seat having a length substantially less than said base member and including a pair of spaced vertical saddle flanges each of which has formed on its upper edges intermediate its ends an arcuate seat for receiving and supporting said cylindrical component thereon, and a pair of laterally spaced apertures formed in said integral guide seat intermediate said spaced saddle flanges, said apertures coinciding with the apertures in said base member for receiving the legs of the clamp member, and plural means on said support frame for attaching the standards thereto.

References Cited by the Examiner

UNITED STATES PATENTS

| | | | |
|---|---|---|---|
| 2,423,757 | 7/47 | Dedge | 248—57 X |
| 2,441,191 | 5/48 | Glassheim | 248—59 |
| 2,661,483 | 12/53 | Tortorice | 248—57 X |
| 2,733,034 | 1/56 | Tormo | 248—72 |
| 2,744,706 | 5/56 | Gerdy | 248—60 |
| 2,981,351 | 4/61 | Knickerbocker et al. | 180—64 |

FOREIGN PATENTS 826,546 1/38 France.

OTHER REFERENCES

Bergen Pipe Support Corp., New York, Catalog No. 551, p. 38, 3rd Fig. from left; received 7/22/56.

CLAUDE A. LE ROY, *Primary Examiner.*

ROBERT C. RIORDON, FRANK L. ABBOTT,
*Examiners.*